United States Patent [19]

Stolarczyk

[11] 4,423,542
[45] Jan. 3, 1984

[54] APPARATUS FOR REPAIR OF WORN CLOCK FRAME BEARING BORES

[76] Inventor: Gregory Stolarczyk, 12910 Orme Rd., Garfield Heights, Ohio 44125

[21] Appl. No.: 217,790

[22] Filed: Dec. 18, 1980

[51] Int. Cl.³ .............................................. B23P 19/04
[52] U.S. Cl. ..................................... 29/231; 74/3.54; 29/232; 29/402.09; 72/409
[58] Field of Search ........... 29/402.01, 402.02, 402.03, 29/402.04, 402.06, 402.08, 402.09, 402.07, 231, 232, 228; 72/409; 74/3.54

[56] References Cited

U.S. PATENT DOCUMENTS

| | | | |
|---|---|---|---|
| 74,601 | 2/1868 | Rothschild | 72/409 |
| 512,221 | 1/1894 | Robinson | 74/3.54 X |
| 597,649 | 1/1898 | Lindas | 72/409 |
| 652,359 | 6/1900 | Haigh et al. | 72/409 |
| 2,051,860 | 8/1936 | Jepson | 74/3.54 |
| 2,477,689 | 8/1949 | Feinbloom | 72/409 X |
| 2,483,765 | 10/1949 | Hamel | 29/149.5 R |
| 2,637,231 | 5/1953 | Schopp | 72/409 |
| 2,730,381 | 1/1956 | Curtiss | 29/513 |
| 2,748,866 | 6/1956 | Zarnowski | 29/513 |
| 3,105,402 | 10/1963 | Tofflemire | 72/387 |
| 3,304,001 | 2/1967 | Forte | 74/3.54 X |
| 3,541,275 | 11/1970 | Bassett | 74/3.54 X |
| 3,664,198 | 5/1972 | Chestnut | 74/3.54 |
| 3,816,896 | 6/1974 | Horsfall | 29/228 |
| 3,956,950 | 5/1976 | Jamell | 140/104 |
| 4,070,898 | 1/1978 | Earle | 72/409 |

FOREIGN PATENT DOCUMENTS 112000 12/1917 United Kingdom ................. 72/356

Primary Examiner—Howard N. Goldberg
Assistant Examiner—V. K. Rising
Attorney, Agent, or Firm—Harvey B. Jacobson

[57] ABSTRACT

A panel of thin bendable material is provided and includes one marginal portion thereof for disposition adjacent the worn side of a journal bore in a clock frame plate with the panel disposed parallelly in juxtaposition with one side of the plate. The aforementioned marginal portion of the panel includes a narrow elongated lengthwise outwardly projecting tongue disposed generally normal to the panel for reception in the worn side of the bore. The tongue is concavo-convex in cross section with the convex side opposing and seated against the worn side of the bore and the concave side of the tongue opposing the side of the bore remote from the worn side thereof. The tongue, therefore, defines an insert for renewing the worn side of the bore and against which the corresponding clock component shaft portion may be journaled.

13 Claims, 13 Drawing Figures

APPARATUS FOR REPAIR OF WORN CLOCK FRAME BEARING BORES

BACKGROUND OF THE INVENTION

Many older upstanding clock frame plates having horizontal journal bores formed therethrough are excessively worn with the result that the corresponding clock component shaft portions are not properly centered causing improper meshing of the associated gear teeth as well as excessive frictional resistance to rotation of those shaft portions.

Although worn journal bore portions of clock frames may be precision bored oversize and sleeved, such repair of old clockwork mechanisms is extremely expensive. Due to this large expense involved in repair of older clockwork mechanisms, many owners of older and antique clocks cannot afford to have their treasured clocks repaired to operative condition. Accordingly, a need exists for a method and apparatus whereby worn clockwork frame journal bores may be inexpensively and effectively repaired.

Various forms of devices heretofore have been provided for repair of worn clock components journal bores and for renewing the size of various bores. Examples of these previously known devices are disclosed in U.S. Pat. Nos. 2,483,765, 2,730,381, 3,105,402, 3,816,896, 3,956,950 and 4,070,898. However, these previously known devices are not specifically designed to perform a reconditioning operation with regard to worn clockwork frame bores in a manner such that the repair operation may be carried out efficiently and inexpensively.

BRIEF DESCRIPTION OF THE INVENTION

The method and apparatus of the instant invention includes the provision of a panel which may be applied to one side of a clockwork frame plate in position with one marginal portion of the panel disposed adjacent a worn side of a journal bore formed in the plate. The marginal portion of the panel includes a narrow elongated tongue formed integrally therewith and which is lengthwise outwardly directed from one side of the panel at substantially right angles relative thereto. The tongue is cylindrically concavo-convex in cross-sectional shape and is disposed in the worn side of the clockwork frame plate bore with the convex side of the tongue opposing and seated against the worn side of the bore and the concave side of the tongue opposing the side of the bore opposite the worn side thereof. By the utilization of such a tongue, the plate may be installed against one side of the clockwork frame plate with the tongue positioned in the worn side of the bore.

The main object of this invention is to provide a method and apparatus for quickly, efficiently and inexpensively repairing worn clockwork frame bores.

Another object of this invention is to provide an apparatus in accordance with the preceding object and constructed in a manner whereby it may be utilized in conjunction with substantially any clockwork frame plate having a worn journal bore formed therein.

Yet another object of this invention is to provide an apparatus for repair of clockwork frame journal bores and which is constructed in a manner enabling repair, in most instances, independent of substantially total disassembly of the associated clockwork mechanism.

A final object of this invention to be specifically enumerated herein is to provide an apparatus in accordance with the preceding objects and which will conform to conventional forms of manufacture, be of simple construction and easy to install, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
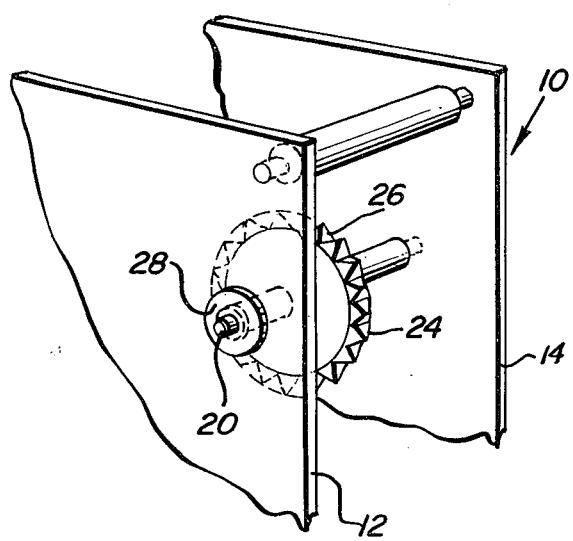
FIG. 1 is a fragmentary, perspective view of a clockwork assembly including a worn frame plate bore having been repaired in accordance with the present invention.
Figure 2:
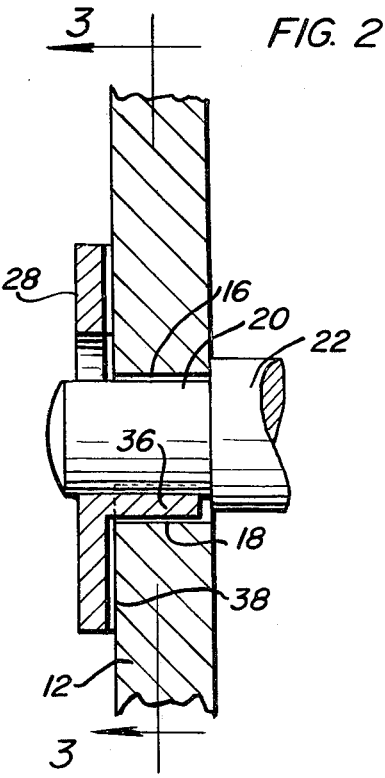
FIG. 2 is an enlarged, fragmentary, vertical sectional view taken substantially upon a plane passing through the center of the repaired bore.
Figure 3:
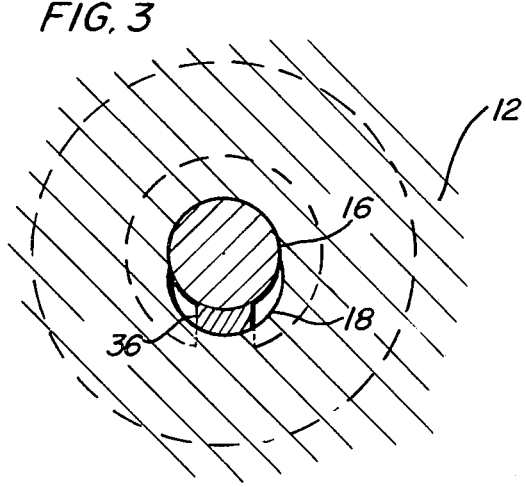
FIG. 3 is a fragmentary, vertical sectional view taken substantially upon the plane indicated by the section line 3—3 of FIG. 2.
Figure 6:
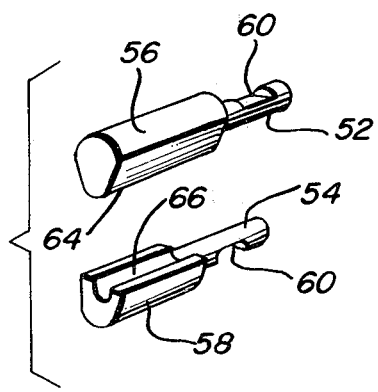
FIG. 6 is an exploded, perspective view of the jaw members of the tool illustrating the manner in which they may be removably supported from the associated tool.
Figure 5:
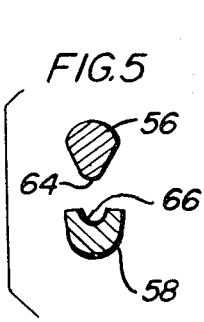
FIG. 5 is a vertical sectional view taken substantially upon the plane indicated by the section line 5—5 of FIG. 4 and illustrating the cross-sectional shape of the jaw members of the tool.

Referring now more specifically to the drawings, the numeral 10 generally designates a conventional form of clockwork mechanism including a pair of generally parallel frame plates 12 and 14.

The frame plate 12 includes a journal bore 16 formed therein having a worn, and thus downwardly extended, lower portion 18. The bore 16 rotatably receives the diametrically reduced end 20 of one shaft portion 22 of a clockwork component 24 therein. Inasmuch as the bore 16 includes the downwardly extended worn lower portion 18, the diametrically reduced end portion 20, before the desired repair is effected, is disposed at an elevation lower than its designed elevation. This, of course, may cause the teeth 26 of the component 24 to mesh incorrectly with an associated toothed wheel (not shown) and may also cause binding of the opposite end of shaft portion 22 to bind in its respective frame plate journal bore (not shown).

Figure 7:
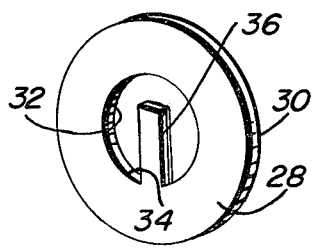
FIG. 7 is a perspective view of a first form of bore repair member prior to lateral deflection of the tongue thereof.

In order to repair the worn portion 18 of the bore 16, a bore repair member 28, see FIG. 7, is provided. The number 28 comprises a panel member of thin metal such as brass, but other materials, including plastics, may be used, if desired. The member 28 is in the form of an annulus including an outer periphery 30 and an inner periphery 32, the peripheries 30 and 32 being generally circular and coaxial. The lower portion 34 of the inner periphery 32 includes an integral elongated and generally rectangular tongue 36 formed therewith and the member 28 is of such construction whereby it may be readily stamped from a sheet of suitable material. Thus, a plurality of members 28 may be inexpensively manufactured.

The thickness of the stock of which the member 28 is formed may vary according to the amount of wear exhibited by the worn portion 18 of the bore 16 and, thus, a person engaged with clock repair may stock a plurality of bearing repair members 28 of different thicknesses. In addition, the rear side of the bearing repair member 28 is provided with an adhesive coating 38 or other fastening method (not shown) such as a screw or screws secured through a marginal portion of the member 28 and threaded in the plate 12. Further, various clamp structures could be used.

Figure 4:
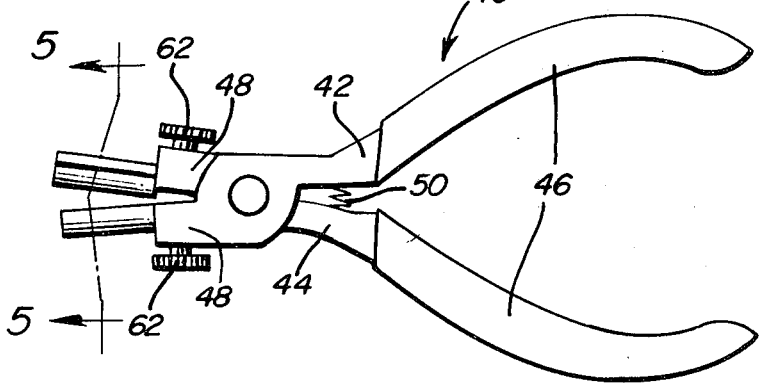
FIG. 4 is a plan view of a tool utilized in conjunction with the apparatus of the instant invention and for the purpose of crimping the bore repair portion of the apparatus in a manner to conform to the desired radius of curvature.
Figure 8:
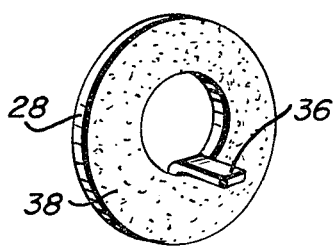
FIG. 8 is a perspective view similar to FIG. 7, but illustrating the rear side of the bore repair member and the manner in which the tongue portion of the member is initially laterally deflected outwardly of the rear side of the bore repair member prior to crimping of the tongue portion to the desired radius of curvature.
Figure 11:
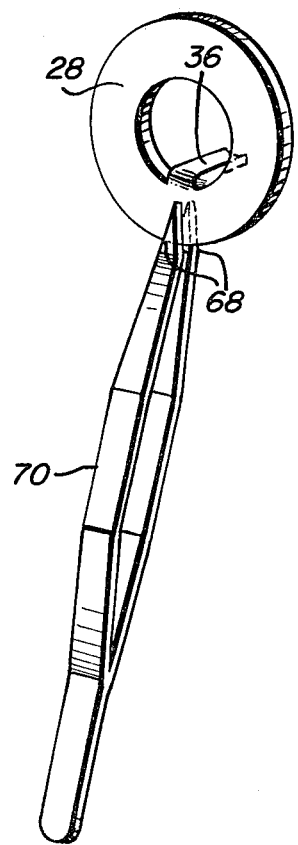
FIG. 11 illustrates a slightly modified form of tweezer which may be utilized to facilitate initial placement of the bore repair member in the desired position relative to a clock frame plate having a worn journal bore formed therein.

Initially, a bearing repair member 28 is selected of the correct thickness and the tongue 36 thereof is thereafter bent in the manner illustrated in FIG. 8 of the drawings in order that the tongue 36 may be disposed at substantially right angles to the medial plane of the bearing repair member 28. Thereafter, the tongue 36 is crimped through the utilization of a tool, such as that generally designated by the reference numeral 40 as illustrated in FIG. 4 of the drawings. The tool 40 is substantially equivalent to a pair of pliers and includes a pair of crossed and pivotally connected levers 42 and 44 having one pair of hand grip defining corresponding ends 46 and a second pair of jaw defining ends 48, a compression spring 50 being disposed between the handle defining ends 46 to yieldingly bias the later apart.

The jaw defining ends 48 have endwise outwardly opening bores (not shown) formed therein in which the mounting shank portions 52 and 54 of a pair of jaw members 56 and 58 are received. The mounting shank portions 52 and 54 include notches 60 formed therein in which the innermost ends of a pair of set screws 62 carried by the jaws 48 may be engaged in order to removably anchor the jaw members 56 and 58 in position supported from the jaws 48.

The jaw member 56 includes a convex semi-cylindrical surface 64 which extends longitudinally thereof and opposes a concave semi-cylindrical surface 66 defined on the jaw member 58. The radius of curvature of the surface 64 is smaller than the radius of curvature of the surface 66 and, accordingly, when the tongue 36 of FIG. 8 is crimped between the jaw member surfaces 64 and 66, the tongue 36 is transformed into a concavo-convex cross-sectional shaped tongue, such as that illustrated at 36 in FIG. 9.

Figure 9:
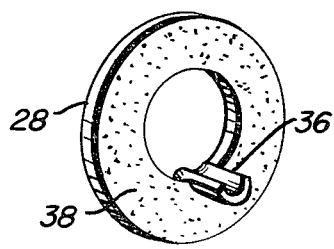
FIG. 9 is a perspective view similar to FIG. 8 with the tongue portion of the bore repair member crimped to the desired cross-sectional radius of curvature.

In order to repair the bore 18, the bearing repair member of FIG. 9 is gripped between the slightly angulated jaws 68 of a pair of tweezers 70 and the reduced end 20 of the shaft portion 22 is upwardly displaced to the uppermost and non-worn portion of the bore 16. Thereafter, the bearing repair member 28 is placed against the outer side of the plate 12 with the crimped tongue 36 inserted into the lower worn portion 18 of the bore 16. The adhesive coating 38 on the bearing repair member 28 is sufficient, in conjunction with the seating of the tongue 36 in the worn portion 18 of the bore 16, to retain the bearing repair member 28 in proper position on the plate 12. Thus, it may be seen that the worn bore portion 18 may be readily repaired through the utilization of the bearing repair member 28 in a manner such that the concavo-convex cross-sectional shaped tongue 36 restores the bore 16 to substantially its original size.

It will, of course, be noted that a person engaged in clockwork repair will also be provided with different jaw members having slightly different radii of curvature surfaces 64 and 66 in order to conform to the radius of curvature of the shaft end portion which is to be journaled in the bore to be repaired.

Figure 10:
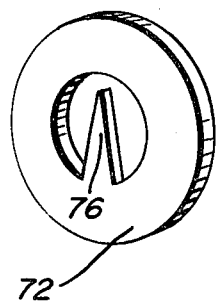
FIG. 10 is a perspective view of a second form of bore repair member utilizing a slightly different shaped tongue.

With attention now invited more specifically to FIG. 10 of the drawings, there may be seen a second form of bearing repair member referred to by the reference numeral 72. The bearing repair member 72 is substantially identical to the bearing repair member 28, except that the tongue portion 76 thereof is generally triangular in shape. The utilization of the triangular shaped tongue 76 merely enables the tongue 76 to be more readily inserted into the worn portion of the bore 18 beneath the shaft end portion 20.

Figure 12:
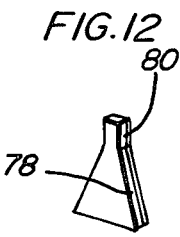
FIG. 12 is a perspective view of a third form of bore repair member prior to the tongue portion thereof being laterally directed to one side thereof.
Figure 13:
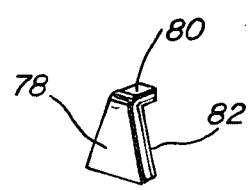
FIG. 13 is a perspective view of the third form of bore repair member with the tongue portion thereof laterally directed to one side of the bore repair member.

With attention now invited more specifically to FIGS. 12 and 13, there may be seen a third form of bearing repair members referred to in general by the reference numeral 78. The bearing repair member 78 comprises only a segment of the annular bearing repair member 28, but is otherwise identical in that the tongue portion 80 thereof is generally rectangular in plan shape. Of course, the tongue 80 may be laterally bent into position disposed at substantially 90° relative to the remainder of the bearing repair member 78 and then crimped between the surfaces 64 and 66. Also, the bearing repair member 78 includes an adhesive coating 82 corresponding to the adhesive coating 38.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A repair journal for a worn shaft journal bore in a clock frame plate, said repair journal comprising a panel member for support from one side of said plate in parallelly juxtaposition thereto, said panel member including a marginal portion thereof for disposition adjacent the worn side of said bore, said marginal portion of said panel member including a narrow laterally projecting tongue supported therefrom adapted to project into said worn portion of said bore, said tongue being transversely concavo-convex with the convex side thereof adapted to at least substantially seat in said worn side of said bore and the concave side thereof being adapted to oppose the side of said bore remote from said worn side, at least one portion of one side surface of said panel member including an adhesive coating, whereby said panel member may be adhesively secured to one side of said frame plate.

2. The combination of claim 1 wherein said tongue tapers outwardly in width toward the free end thereof.

3. The combination of claim 1 wherein said tongue includes substantially straight outwardly convergent opposite side longitudinal edges terminating outwardly in a pointed apex portion.

4. The combination of claim 1 wherein said opposite side longitudinal edges of said tongue are outwardly inclined toward each other and include oppositely angulated generally parallel free end portions.

5. The combination of claim 1 wherein said tongue is generally rectangular in plan shape.

6. The combination of claim 1 wherein said panel member has a central opening formed therein, said marginal portion of said panel member comprising one marginal portion thereof defining said opening.

7. The combination of claim 6 wherein said panel member is generally circular.

8. The combination of claim 7 wherein said opening comprises a circular opening generally centered relative to said panel member.

9. The combination of claim 1 wherein said panel member comprises an elongated panel member with opposite longitudinal side edges convergent toward one pair of corresponding ends and terminating in oppositely angulated generally parallel opposite end edge portions between which said tongue is defined.

10. In combination with a clock frame plate including a shaft journal bore formed therethrough having at least one radially outwardly enlarged worn peripheral portion, a repair journal for said bore comprising a panel member mounted from said plate and overlying one side thereof in parallelly juxtaposition thereto, said panel member including a marginal portion thereof disposed adjacent said worn peripheral portion, said marginal portion of said panel member including a narrow laterally projecting tongue supported therefrom projecting into said worn peripheral portion, said tongue being transversely concavo-convex with the convex side thereof at least substantially seated against said worn peripheral portion and the concave side thereof opposing and coacting with the side of the journal bore opposite the worn peripheral portion thereof to restore the journal bore to substantially its original size.

11. The combination of claim 10 wherein said panel member has a central opening formed therein, said marginal portion of said panel member comprising one marginal portion thereof defining said opening.

12. The combination of claim 10 wherein at least one portion of the side surface of said panel member opposing said frame plate includes an adhesive coating adhesively securing said panel member to the opposing side of said frame plate.

13. The combination of claim 10 wherein said panel member comprises an elongated panel member and said tongue comprises an integral laterally directed end portion of said elongated panel member.

* * * * *